(12) United States Patent
Kunert

(10) Patent No.: US 11,619,055 B1
(45) Date of Patent: Apr. 4, 2023

(54) OUTDOOR ELECTRICAL CABINET AND METHOD OF CONSTRUCTION

(71) Applicant: James M. Kunert, Roseburg, OR (US)

(72) Inventor: James M. Kunert, Roseburg, OR (US)

( * ) Notice: Subject to any disclaimer, the term of this patent is extended or adjusted under 35 U.S.C. 154(b) by 0 days.

(21) Appl. No.: 17/846,610

(22) Filed: Jun. 22, 2022

(51) Int. Cl.
*E05G 1/02* (2006.01)
*E04H 1/12* (2006.01)
*E05B 65/00* (2006.01)
*H02B 1/38* (2006.01)

(52) U.S. Cl.
CPC ....... *E04H 1/1238* (2013.01); *E05B 65/0089* (2013.01); *H02B 1/38* (2013.01); *E05Y 2900/208* (2013.01)

(58) Field of Classification Search
CPC ..... E04H 1/1238; E05B 65/0089; H02B 1/38; H02B 1/30; H02B 1/301; E05G 1/02; E05G 1/024; E05G 1/026; A47B 47/00; A47B 47/0083; A47B 47/021; A47B 47/03; A47B 47/045
USPC .............. 109/77–79, 59 R, 59 T, 64, 67, 74; 52/79.1, 79.5, 79.9, 293.3, 295, 296, 52/282.1, 282.4, 764; 312/265.1, 265.2, 312/265.3
See application file for complete search history.

(56) References Cited

U.S. PATENT DOCUMENTS

| | | | |
|---|---|---|---|
| 5,165,770 A | 11/1992 | Hahn | |
| 6,238,027 B1 * | 5/2001 | Kohler | E05D 5/023 312/265.3 |
| 6,238,029 B1 | 5/2001 | Marzec et al. | |
| 6,334,278 B1 * | 1/2002 | Arnold | E04H 9/06 52/79.5 |
| 6,478,391 B1 | 11/2002 | Stoever | |
| 6,786,009 B1 * | 9/2004 | McGunn | F16B 12/32 52/36.2 |
| 6,789,859 B1 | 9/2004 | Ho | |
| 7,207,636 B2 | 4/2007 | Livingston et al. | |
| 7,299,531 B2 * | 11/2007 | Staples | G01B 3/303 29/469 |
| 7,352,564 B2 | 4/2008 | Courtney | |
| 7,781,675 B2 | 8/2010 | Adduci et al. | |
| 7,795,532 B2 | 9/2010 | Walker | |
| 8,289,664 B2 | 10/2012 | Haines et al. | |
| 8,395,046 B2 | 3/2013 | Nicewicz et al. | |
| 8,487,584 B2 | 7/2013 | Taylor-Haw et al. | |
| 9,351,427 B2 | 5/2016 | Lewis, II et al. | |
| 9,480,176 B2 | 10/2016 | Englert et al. | |
| 10,455,395 B2 | 10/2019 | Gharabegian | |
| 10,659,240 B2 | 5/2020 | Boemi et al. | |
| 10,663,217 B2 | 5/2020 | Kuehl et al. | |
| 10,772,222 B2 | 9/2020 | Wang et al. | |

(Continued)

FOREIGN PATENT DOCUMENTS

| | | |
|---|---|---|
| CN | 210926725 U | 7/2020 |
| CN | 212033567 U | 11/2020 |
| EP | 2789951 B1 | 10/2020 |

*Primary Examiner* — Suzanne L Barrett
(74) *Attorney, Agent, or Firm* — Howard Russell

(57) ABSTRACT

Method and apparatus for outdoor electrical cabinet adapted for installation in the field comprising: a rectangular base member comprising a plurality of pegs for positioning and retaining four rounded corner steel tube post members for supporting hardware for installing side panels and swinging hinged, lockable doors, and a top member resting on the side panels and secured in place with caps onto the tube post members.

9 Claims, 17 Drawing Sheets

(56) References Cited

U.S. PATENT DOCUMENTS

| | | | | |
|---|---|---|---|---|
| 2001/0039770 A1* | 11/2001 | Arnold | ...................... | E04H 9/14 |
| | | | | 52/169.6 |
| 2006/0179724 A1* | 8/2006 | Lee | ........................... | E04H 3/02 |
| | | | | 52/79.1 |
| 2009/0267463 A1* | 10/2009 | Nilsson | .............. | A47B 47/0083 |
| | | | | 312/138.1 |
| 2021/0140222 A1* | 5/2021 | Meyer | ...................... | E05G 1/026 |
| 2022/0271517 A1* | 8/2022 | Hanna | .................. | H02B 11/167 |

* cited by examiner

OUTDOOR ELECTRICAL CABINET AND METHOD OF CONSTRUCTION

CONTINUITY AND CLAIM OF PRIORITY

This is an original U.S. nonprovisional patent application.

FIELD

The invention relates to electrical cabinet apparatus and methods for installing them, and more particularly the invention relates to a uniquely fabricated electrical cabinet that has a simplified and unique method of installation for protection of electrical components from weather, damage, tampering, or theft.

BACKGROUND

There have been provided and generally known outdoor electrical cabinets, such as those often used for housing electrical components used for powering charging stations (i.e., for use in supplying power to electric car charging stations), for protecting electrical components 10 (FIG. 2A) housed within the electrical cabinets. The electrical components 10 may comprise a standard power panel with a power meter on it as provided by a power servicing company. The electrical components 10 are supplied with electricity from buried power lines 11 passing through an opening 225 in a cement base on the ground, such as a standard cement transformer base 220. Further, the electrical components may be retained on racks (not shown) housed within the electrical cabinets installed on the base. The electrical components are thus protected inside the electrical cabinet from weather, damage, tampering, or theft.

While the above-mentioned electrical cabinets have been useful in protecting the electrical components as stated, the cabinets themselves have been unduly difficult to construct and install in the field, and thus there has developed a need for an effective electrical cabinet that is less expensive and simpler to construct/install, whether construction takes place based on a kit provided for use in the field, or whether the cabinet is pre-fabricated and simply installed in the field. Such an apparatus and method of installation would ideally be comprised of readily available, highly durable, components and materials, all to provide a quality cabinet while saving on construction and installation costs.

SUMMARY

In accordance with an aspect and embodiment of the disclosure, there is provided an outdoor electrical cabinet adapted for substantial construction (i.e., from a kit having a minimum of components pre-attached) and installation in the field on an existing, typically cement, transformer base, the cabinet being adapted for protecting electrical components from weather, damage, tampering, or theft. The cabinet comprises: a base member adapted for supporting the cabinet on the transformer base, the base member defining a plurality of holes adapted for enabling attachment of the base member to the transformer base with lag bolts, the base member further comprising a plurality of pegs.

The cabinet further comprises a plurality of rounded corner steel tube post members, each post member having first and second ends, the first end of each post member being adapted for closely fitting onto a corresponding peg of the base member, wherein at least one of the post members further comprises a fixed portion of a hinge member attached thereto, and wherein at least one other of the post members further comprises a door-stop member attached thereto, each post member further comprising a channel member (such as a power-strut type channel member) attached to the post member.

The cabinet further comprises at least one side panel member and at least one door member, the at least one side panel member comprising upper and lower edges and two side edges, each side panel member adapted for attachment between the side edges of the side panel members and the channel member of each post. The at least one door member comprises upper and lower edges and two side edges, each the door member adapted for hinged attachment on one side edge thereof to the hinge member attached to the at least one of the post members, the other side edge of each door member further being adapted for lockable engagement adjacent the door-stop member attached to the at least one of the post members.

The cabinet further comprises a top member defining a plurality of holes adapted for corresponding with and passing over the second ends of the post members, the top member having an underside surface portion for resting on the upper edge of the at least one side panel. Further, there are provided a plurality of top caps adapted for installation on the second ends of the plurality of corner posts, each top cap being adapted for being press-fit attached to the second ends of the plurality of corner posts. The plurality of top caps are adapted for securing the top member in place resting on the side panel members, wherein the top member inhibits precipitation from entering a gap left between the upper edge of the at least one door member and the top, the gap being adapted for allowing swinging door clearance between the at least one door member and the top member.

In a preferred embodiment of this aspect of the disclosure, the electrical cabinet comprises a plurality of door members, one of the plurality of door members comprising a plurality of lock means adapted for controlling lockable access by a plurality of different lock keys (e.g., for the power company and the entity maintaining the cabinet via the front door). Still further, in a preferred embodiment, the plurality of door members of the electrical cabinet preferably comprises first and second door members (e.g., front and rear door members), wherein the front door member provides lockable access by two different lock keys, and wherein the rear door member provides lockable access to at least one lock key. Further, in an embodiment of the disclosure, the cabinet side panel members and door members preferably comprise a rectangular lockable box having a rectangular top member.

Preferably, the plurality of rounded corner steel tube corner post members comprises four corner post members, each comprised of existing rounded corner steel stock having four flat surfaces, each flat surface extending along a length of each corner post member, and each flat surface being interconnected with two other flat surfaces of the corner post member with rounded corner radii, each corner radius preferably extending along the entire length of each corner post member as well.

In a simplified, and therefore preferred, embodiment, the electrical cabinet is provided with two corner post members of the plurality of corner post members further comprising a hasp attached to the corner post members (i.e., opposite the hinged corner post members), wherein with this embodiment each of the first and second door members further define a hasp receiving opening adjacent one of the side edges of each of the first and second door members for facilitating locking of the first and second door members. Thus, with this embodiment, each of the hasps is adapted for insertion through the opening in the corresponding opening in the first and second door members, to be adapted for receiving and retaining a lock bar and/or a padlock (or padlocks) to allow locking of each the first and second door with padlock means as previously described.

Preferably, each of another two corner post members of the plurality of corner post members of this aspect and embodiment of the disclosure further comprises a fixed portion of a hinge attached to the each of two other corner post members (i.e., the corner post members not having hasps thereon). In this preferred embodiment, each of the first and second door members further comprises a leaf portion of a hinge attached to an edge of each the first and second door members opposite the hasp receiving opening of each of the door members. The hinges (part of which are installed on the doors and part of which are installed hinged posts) are adapted for pivotable attachment of each of the doors (first and second doors) to corresponding fixed portions of the hinge attached to each of the other (preferably two) corner post members, with the fixed portion of the hinge and the leaf portion of the hinge being adapted for receiving and retaining a hinge pin to pivotably retain the hinge portions together while enabling each of the first and second doors to pivot about the hinged post members on the hinge portions.

Preferably, the top member of the cabinet comprises edges that overhang each side panel member and each at least one door member, with each edge of the top member being curved downwardly to help prevent precipitation from getting into the gap between the top member edges, the at least one door member, and the abutment between the top member and the side panel top edges.

Thus, in a preferred embodiment able to be constructed in the field from a kit, it will be appreciated that certain elements may be advantageously pre-constructed, such as, for example and not including an exhaustive listing, by having hinge portions to doors pre-attached, by having some post members with hasps and stops pre-attached, and/or by having other post members with hinge portions pre-attached as known in the art of attachment of hinges to doors as with screws and bolts, and/or welding where advantageous.

In accordance with another aspect and embodiment of the disclosure, there is provided a pre-constructed (i.e., not constructed in the field from a kit) outdoor electrical cabinet adapted for installation on an existing, typically cement, transformer base, the cabinet being adapted for protecting electrical components from weather, damage, tampering, or theft. The cabinet in accordance with this aspect and embodiment of the disclosure may be pre-fabricated/constructed in a shop, warehouse, or the like, and comprises: a base member adapted for supporting the cabinet on the transformer base, the base member defining a plurality of holes adapted for enabling attachment of the base member to the transformer base with lag bolts, the base member further comprising a plurality of pegs, wherein preferably the base member is rectangular having four corners, there being a peg at each corner of the base member.

The cabinet in accordance with this aspect and embodiment further comprises: a plurality, preferably four, rounded corner steel tube post members, each post member having first and second ends, each post member being comprised of existing rounded corner steel stock having four flat surfaces, each flat surface extending along a length of each corner post member, and each flat surface being interconnected with two other flat surfaces with rounded corner radii, each corner radius extending along the length of each corner post member, the first end of each post member being pre-attached onto a corresponding peg of the base member, wherein a first plurality (preferably two) of the post members further comprise a fixed portion of a hinge member pre-attached thereto, and wherein a second plurality (preferably two other) of the post members further comprises a door-stop member pre-attached thereto, each of the plurality of post members further comprising a channel member (such as a power-strut type channel member) pre-attached to the post member, wherein each of the second plurality of post members further comprises a hasp pre-attached to each of the post members.

In accordance with this aspect and embodiment of the disclosure, the cabinet is further preferably provided with a plurality of side panel members (preferably two rectangular side panel members), each side panel member comprising upper and lower edges and two inwardly curved side edges, each side panel member being pre-attached between the curved side edges and the channel member of each post. Further, in accordance with this aspect of the disclosure, there are provided a plurality of lockable door members (preferably two rectangular lockable door members), each door member comprising upper and lower edges and two inwardly-curved side edges, each door member having a leaf portion of a hinge attached to a side edge of the door member and being hinged pre-attached on the side edge of the door member to the hinge member fixed portions attached to the hinged post members. Opposite the hinged portion of each door member, preferably each door member defines a hasp receiving opening adjacent the other of the side edges of each of the door members for facilitating locking of each of the door members, the hasp adapted for insertion through the opening in each door member to be adapted for receiving and retaining a lock bar and padlock(s) allowing locking of each the door members with lock means.

This embodiment of the cabinet in accordance with the disclosure further comprises a preferably rectangular top member having four corners and four downwardly curved edges and defining a plurality of holes adjacent each corner of the top member through which the second ends of the post members pass, the top member having an underside portion that rests on the upper edge of each side panel. Further, this embodiment of the cabinet further comprises a plurality, preferably four, top caps, the top caps adapted for installation on the second ends of the posts, each top cap being press-fit attached to the second end of a corresponding post, the top caps securing the top member in place resting on the side panel members, wherein the downwardly curved edges of the top member inhibit precipitation from entering gaps left between the upper edge of the door members and the top member, the gaps also being adapted for allowing swinging door clearance between the door members and the top member.

Thus, while the cabinet in accordance with an embodiment may be constructed in the field from a kit, of course it will be appreciated that it may likewise be pre-constructed, or pre-fabricated using readily available components, and simply installed in the field.

In accordance with another aspect of the disclosure, there is provided a method of constructing and installing an electrical cabinet in the field on a typically cement transformer base and over pre-installed power distribution electronics, comprising:

A. Placing a frame base having anchor holes therein and corner pegs thereon at a desired position on a pre-poured cement transformer base;

B. Marking placement for anchor bolts onto the transformer base;

C. Drilling holes into cement of the transformer base at marked locations;
D. Securing frame base to transformer base with a plurality of concrete anchor bolts;
E. Placing a hinged post with a hinged portion and a channel member thereon on a left rear corner peg of the frame base and tightening a set screw to hold the post in place on the corner peg;
F. Placing a lock post with a stop member and hasp combination and a channel member thereon on the right rear corner peg of the frame base and tightening a set screw to hold the post in place on the corner peg;
G. Placing another hinged post with a hinge portion and a channel member thereon on the right front corner peg of the frame base and tightening a set screw to hold the post in place on the corner peg;
H. Placing another lock post with a stop member and hasp combination and a channel member thereon on the left front corner peg of the frame base and tightening a set screw to hold the post in place on the corner peg;
I. Placing a left-side panel on a left side of the structure and securing it to the channel members of the left-side posts;
J. Placing a right-side panel on a right side of the structure and securing it to the channel members of the right-side posts;
K. Positioning rear door with hinge portions to align with hinge portions on the rear left post and inserting retaining pins in the hinge portions;
L. Positioning front door with hinge portions to align with hinge portions on the front right post and inserting retaining pins in the hinge portions;
M. Sliding a top member over the four posts through holes provided in the top member;
N. Placing post caps at the top of each of the four posts;
O. Installing front and back padlocks to secure the structure.

While it will be appreciated that the cabinet of the present disclosure may be pre-fabricated in a shop or warehouse before installation, it may also advantageously be constructed and installed from a kit in the field.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings, wherein like reference characters refer to like elements.

BRIEF DESCRIPTIONS OF DRAWINGS

Figure 1:
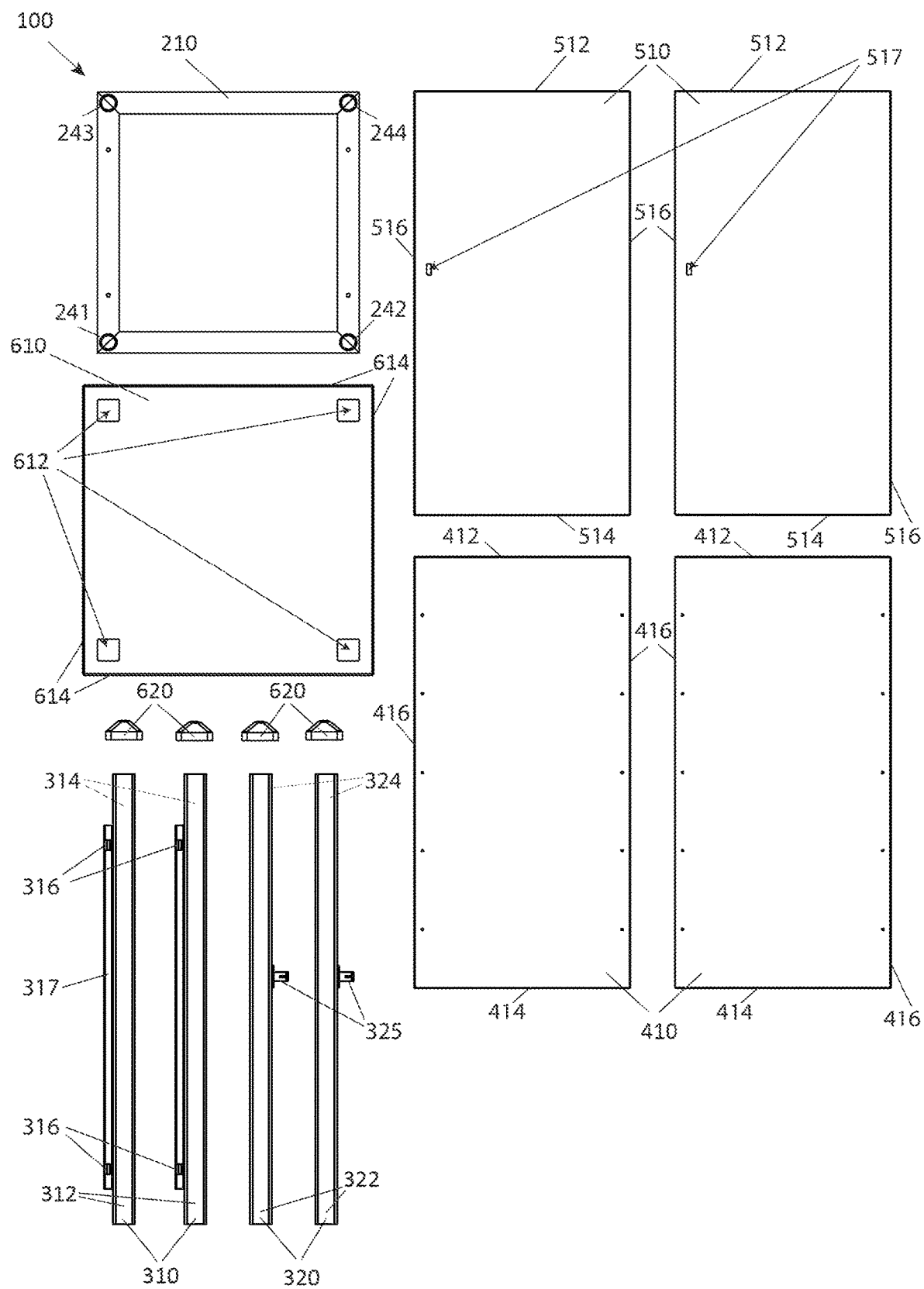
FIG. 1 illustrates a kit of components suitable for use in constructing an electrical cabinet in the field and in accordance with an aspect and embodiment of the disclosure.
Figure 12:
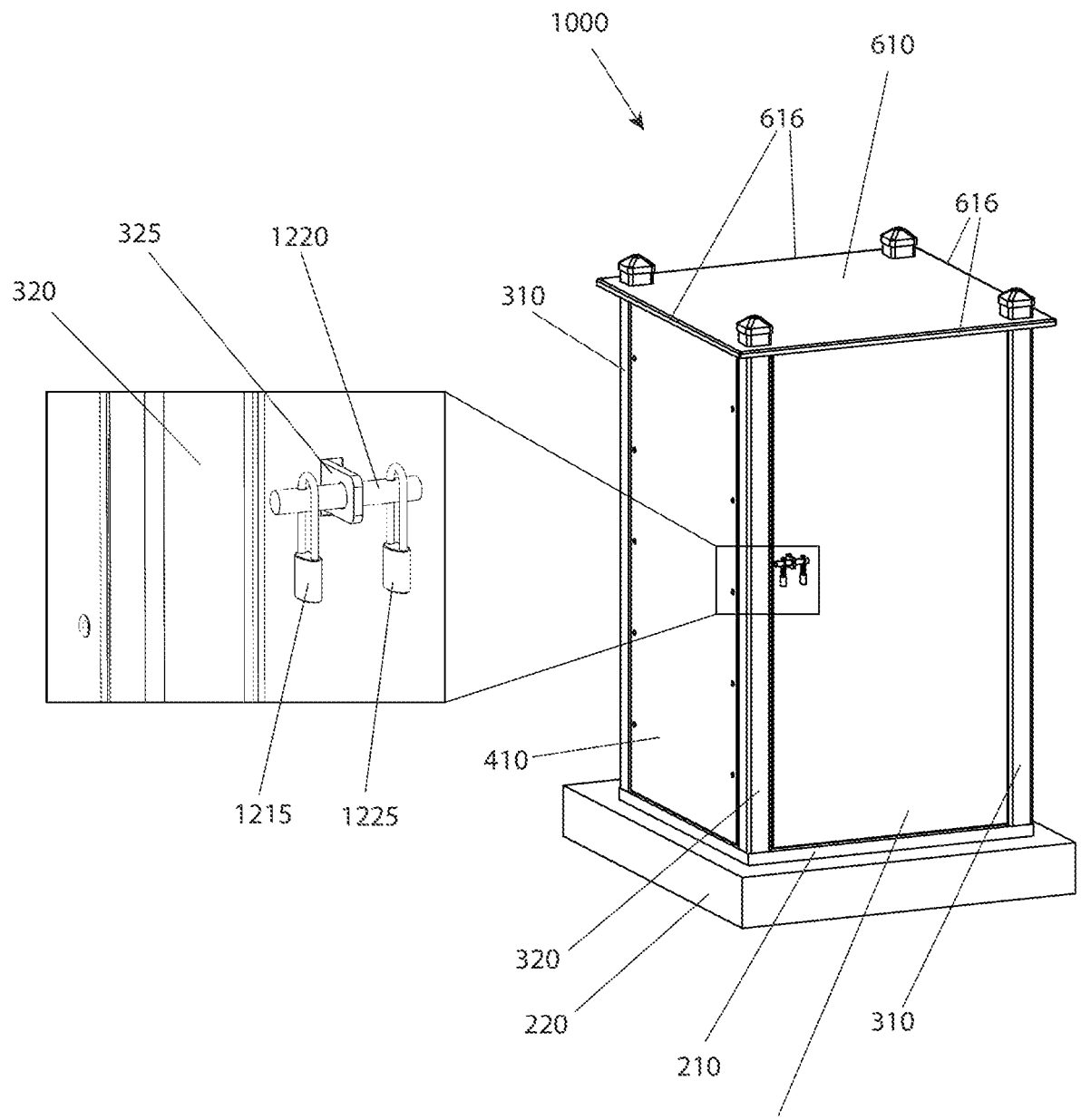
Figure 13A:
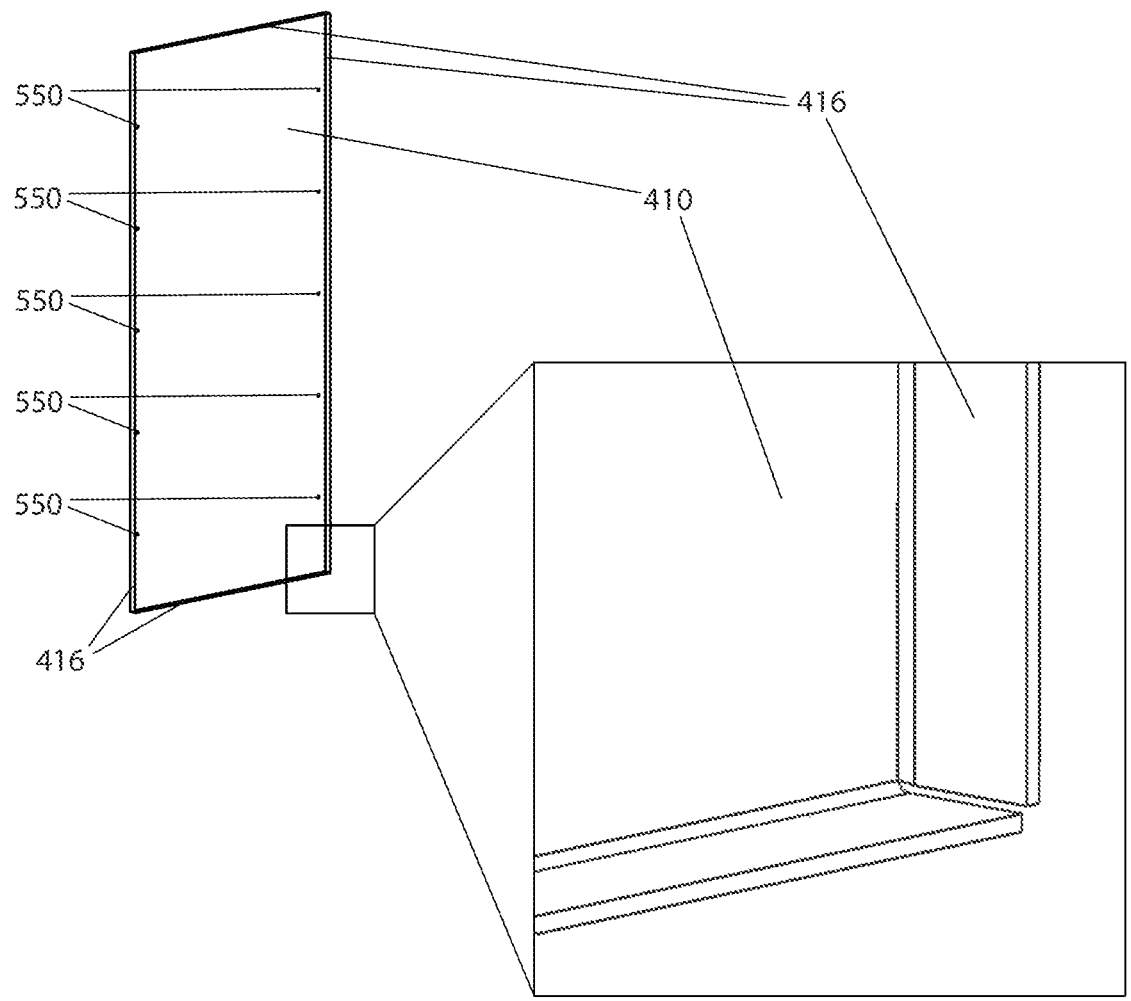
Figure 13B:
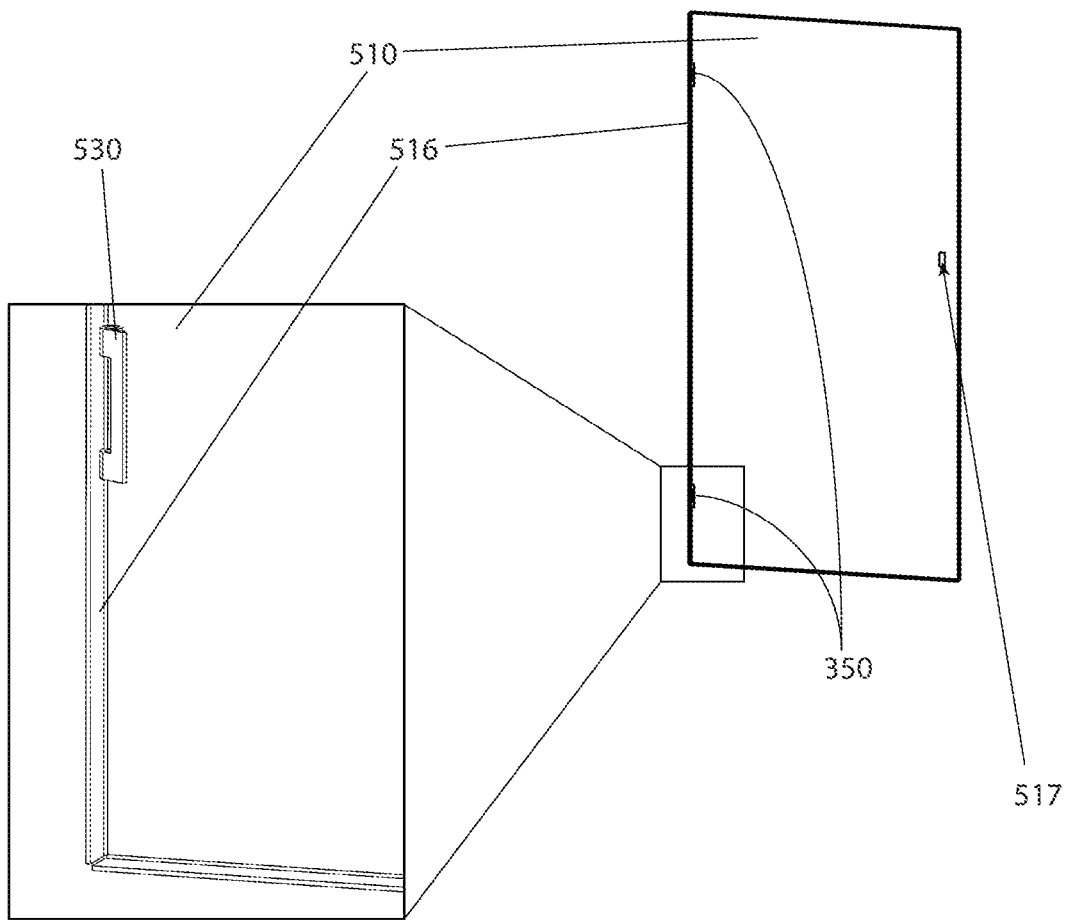
Figure 13C:
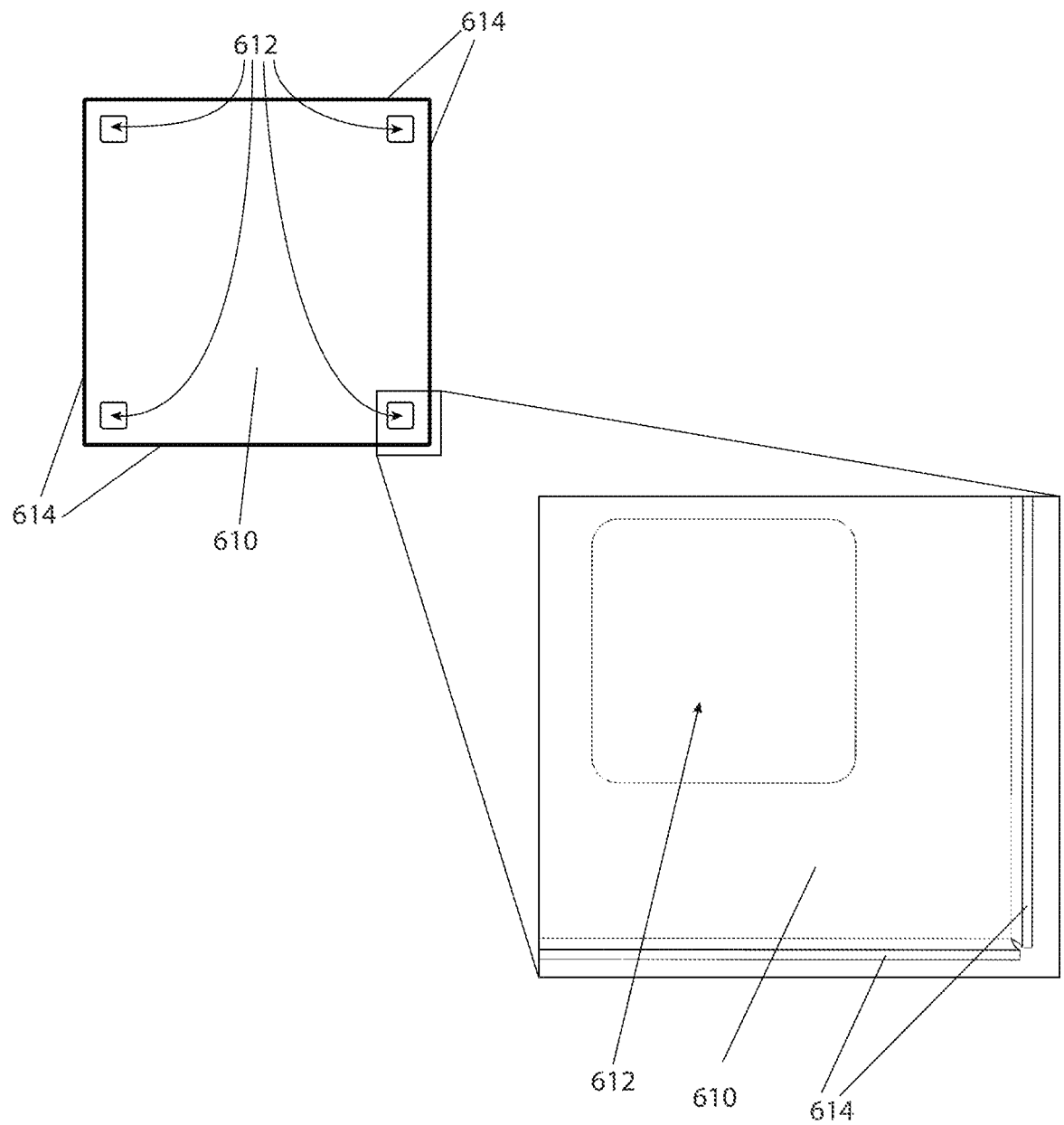

FIG. 1*i* shows an inside left side view of a lock post, together with a detail view of a hasp of the post of an electrical cabinet in accordance with an aspect and embodiment of the disclosure;

FIG. 12 is a top front left perspective view of a completed cabinet, together with a detail view of a double lock system in accordance with an aspect and embodiment of the disclosure and as may have been pre-fabricated for installation in the field, or constructed and installed completely in the field from a kit; and FIGS. 13A, 13B, 13C are detailed views showing preferably curved edges of side panels, door panels, and the top

DETAILED DESCRIPTION

Figure 2A:
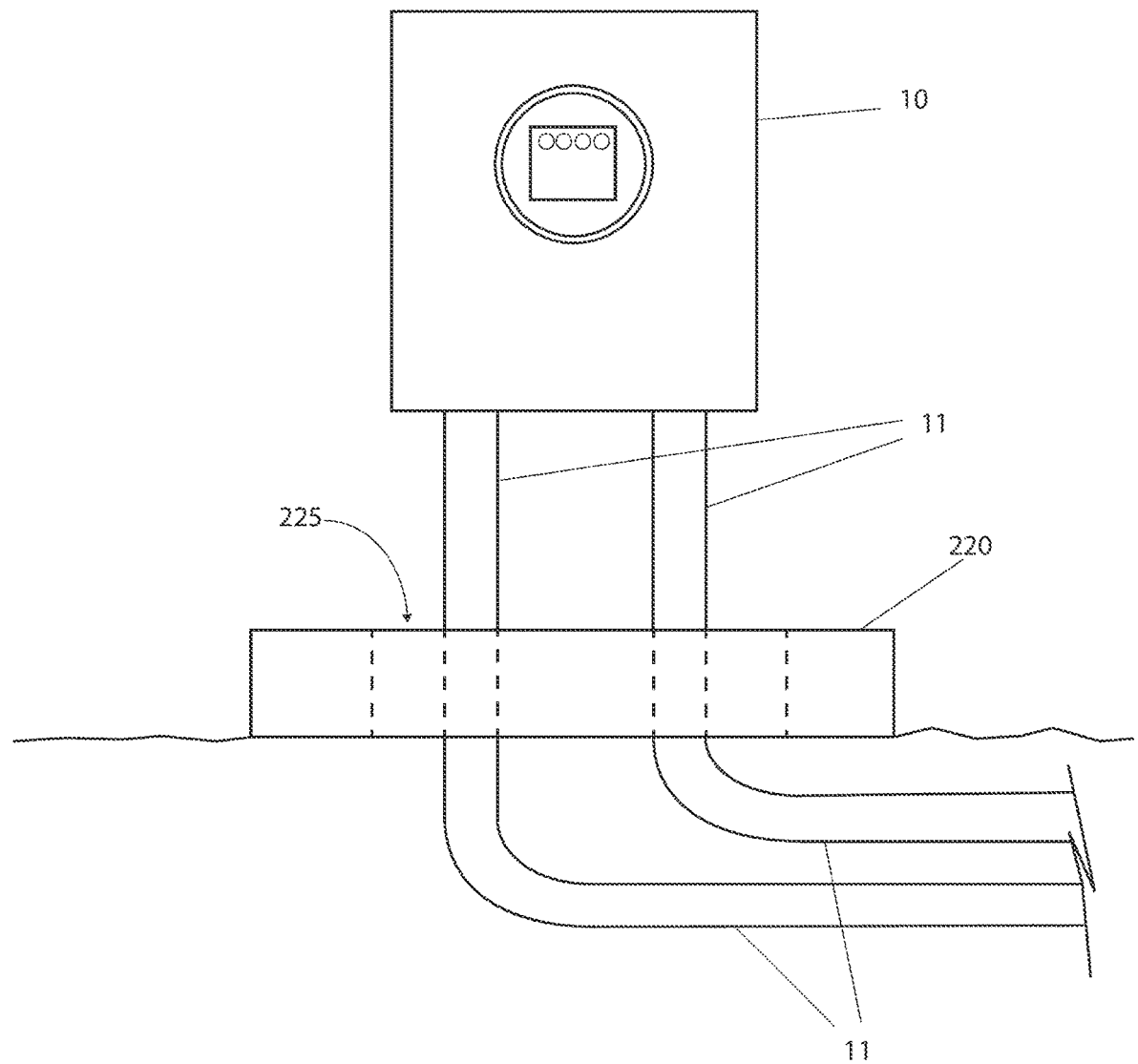
FIG. 2A illustrates an electrical distribution system installed at a site with a transformer base, before installation of an electrical cabinet in accordance with an aspect and embodiment of the disclosure.
Figure 2B:
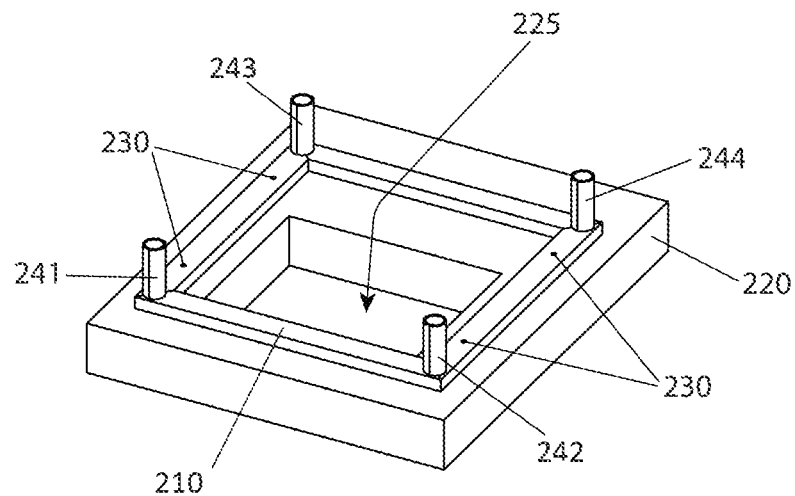
FIG. 2B illustrates a base member portion adapted for installation on a transformer base in the field for an electrical cabinet in accordance with an aspect and embodiment of the disclosure.
Figure 2C:
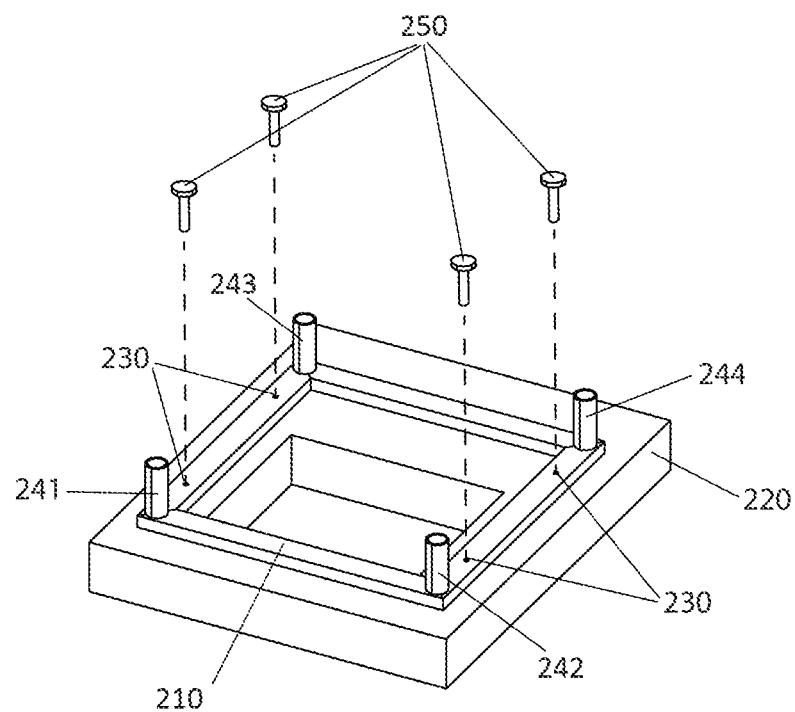
FIG. 2C is a top front right perspective view showing the base member of FIG. 2B together with lag screws adapted for securing the base member to a cement transformer base.
Figure 7:
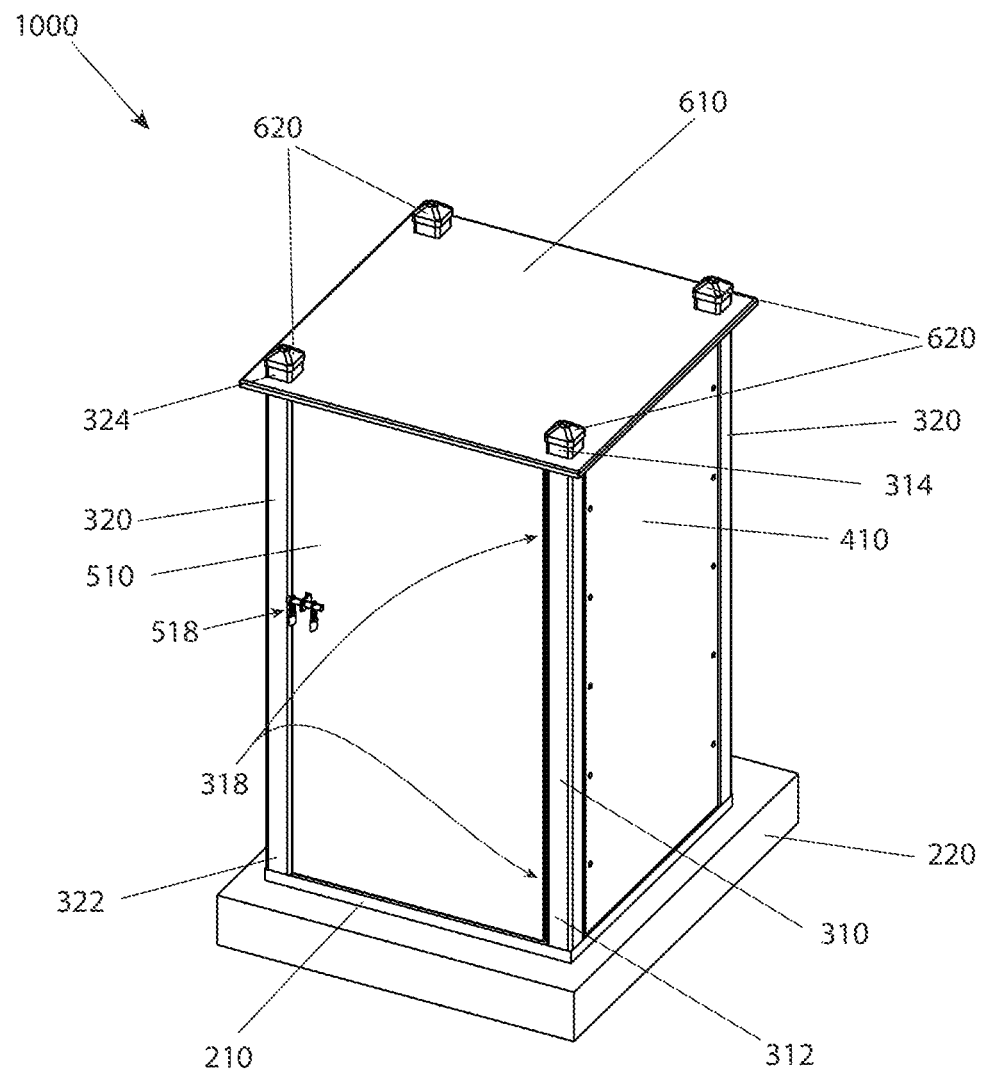
FIG. 7 is a top front right perspective view of a completed electrical cabinet, including double locking front door, in accordance with an aspect and embodiment of the disclosure.

Referring to FIGS. 1, 2A-2C, and 3, there is provided an easy-to-install, using a minimum of tools, outdoor electrical cabinet kit 100 (see FIG. 1) comprised of commonly available and easy to construct components, adapted for constructing a cabinet 1000 (see FIG. 7) and installation of the cabinet in the field on an existing, typically cement, transformer base 220 (see FIGS. 2A-2C). As is generally known in the prior art, outdoor electrical cabinets provided are generally known for being adapted for protecting electrical components 10 (see FIG. 2A) supplied with electricity from buried power lines 12 passing from beneath the ground through an opening 225 in the cement transformer base 220, the electrical components being retained on racks (not shown) housed within such cabinets installed on the cement transformer base, the electrical cabinet serving to protect the electrical components from weather, damage, tampering, or theft.

The easy-to-install and construct kit 100 comprises the following fundamental pre-fabricated components able to be constructed/installed in the field using a minimum of tools: a preferably rectangular/square steel base member 210 adapted for supporting the cabinet on the transformer base 220, the base member defining a plurality of holes 230 adapted for enabling attachment of the base member to the transformer base with lag bolts 250, the base member further comprising a plurality (preferably 4) corner pegs 241, 242, 243, 244.

The kit 100 further comprises a plurality, or four per this embodiment, of rounded corner steel tube post members 310, 320, wherein two post members 310 are hinge post members, and two post members 320 are lock post members. The hinged post members 310 have first ends 312 and second ends 314, and the lock post members 32o have first ends 322 and second ends 324. The first ends 312, 322 of each post member 310, 320, respectively, are adapted for closely fitting onto corresponding pegs 241, 242, 243, 244 (see FIG. 3), with first ends 312 being adapted for closely fitting onto corner pegs 242, 243 of the base member 210, and with first ends 322 being adapted for fitting onto corner pegs 241, 244—it being notable that each of the corner pegs 241, 242, 243, 244 are of uniform size, and each of the post members 310, 320 are preferably hollow steel tubes as are commonly available and of uniform size and cross-section inner and outer dimensions. The commonly available and uniform size and cross-section inner and outer dimensions of the post members 310, 320 preferably fit onto the corner pegs, 241, 242, 243, 244 with a very close tolerance fit, if not a press, or force, fit. At least one (but preferably two) of the post members 310 further comprises an attached (as by welding or otherwise fixing) fixed portion 316 (of a hinge member 318) pre-fabricated so as to be attached to each post member 310, and wherein at least one other of the post members 320, but preferably two of the post members, each further comprises a door-stop member and hasp 325 combination attached thereto.

Figure 3:
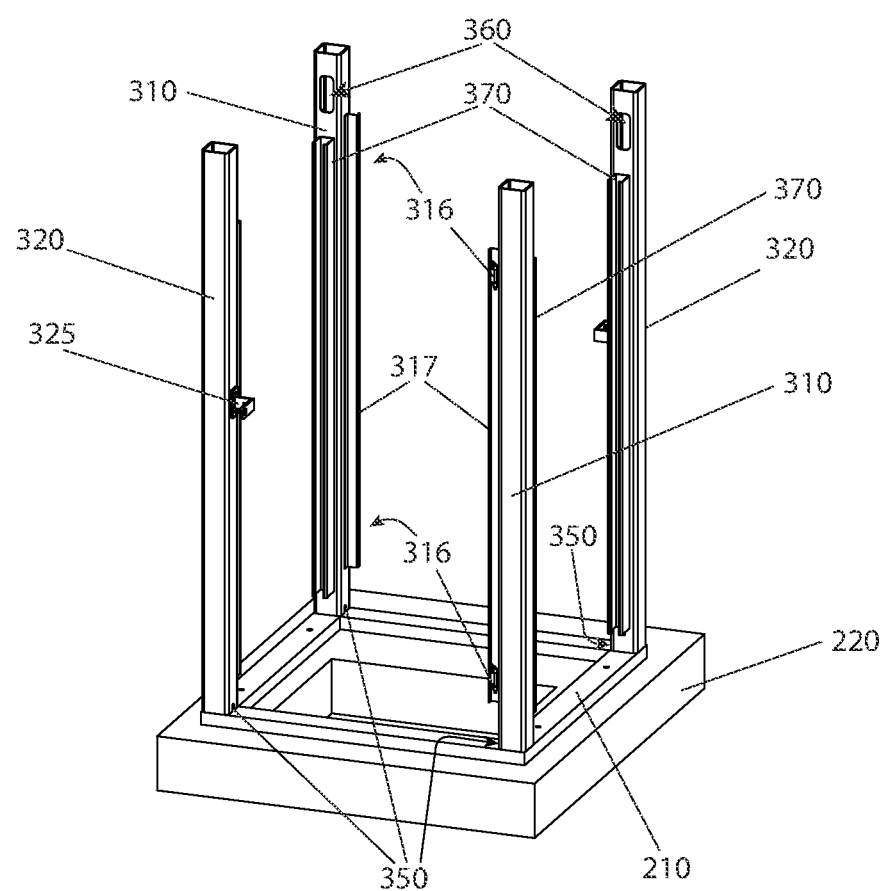
FIG. 3 is a top front right perspective view showing the installation of four corner post members (two hinged post members and two lock post members) installed on corner peg portions of the base member.
Figure 4:
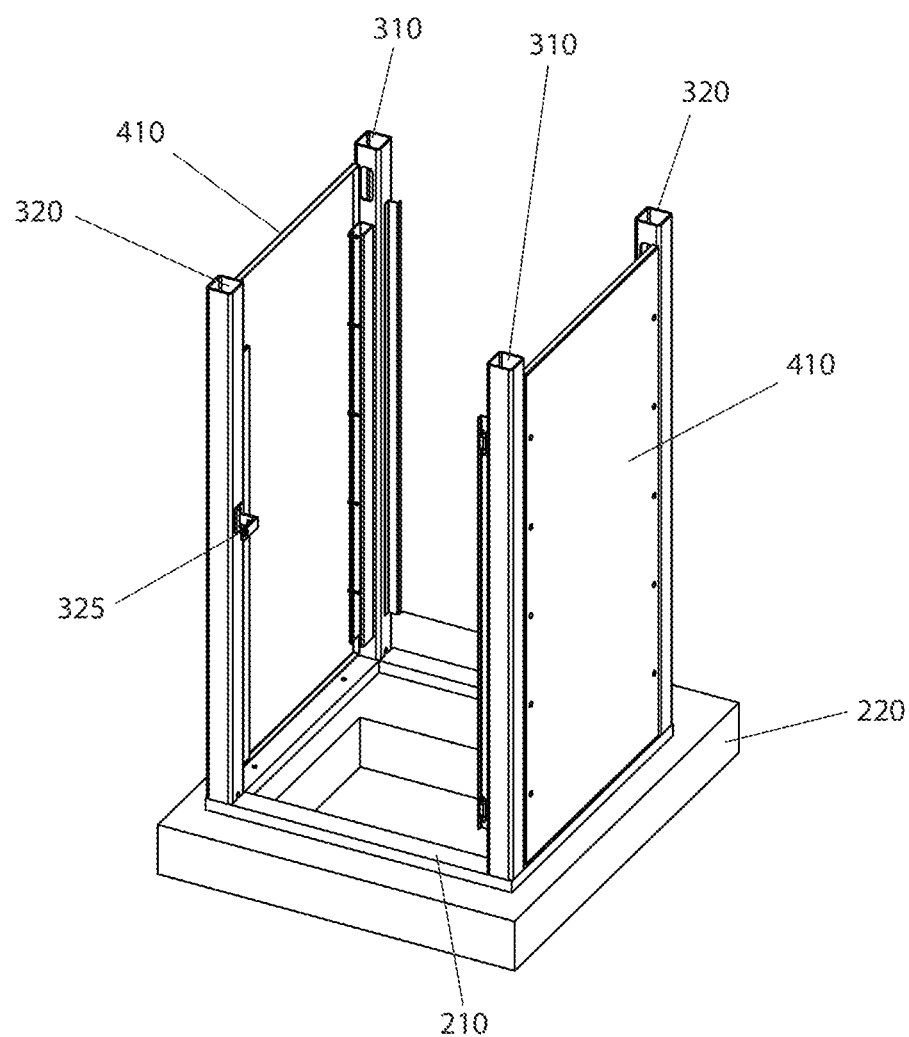
FIG. 4 is a top front right perspective view showing the installation of two side panels of an electrical cabinet in accordance with an aspect and embodiment of the disclosure.
Figure 5:
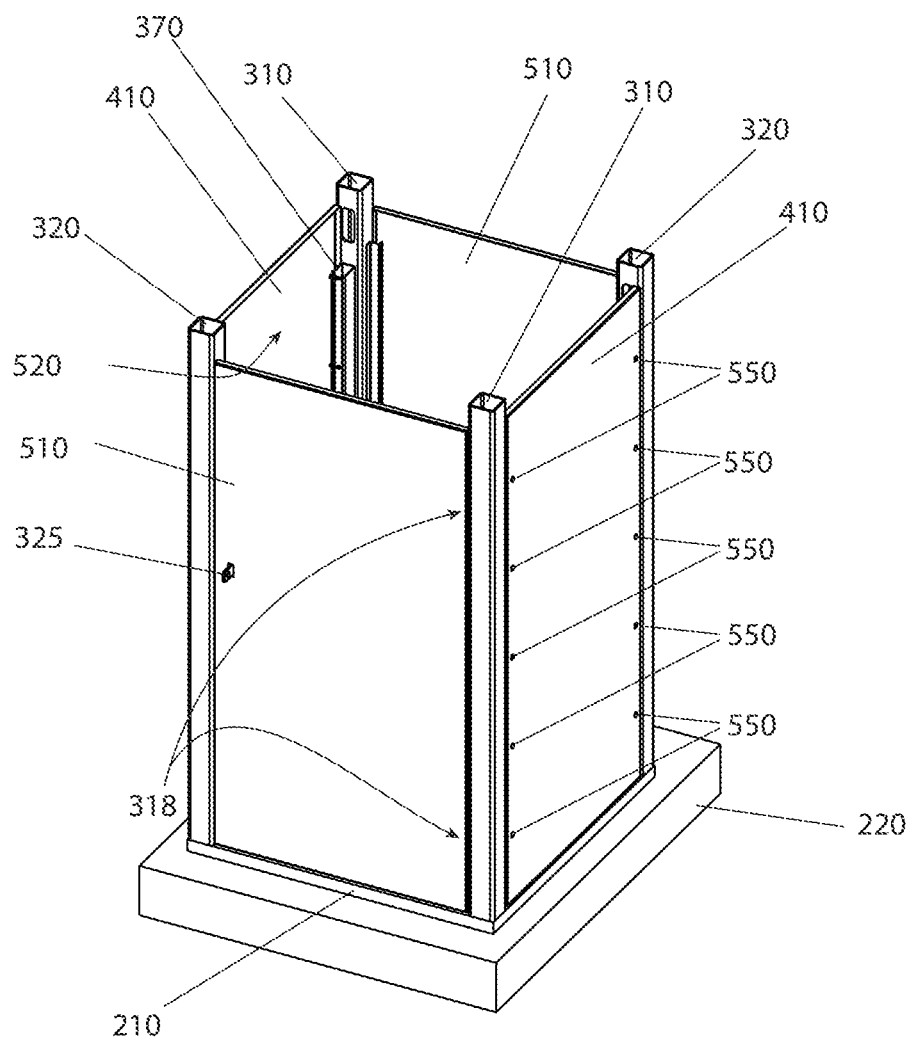
FIG. 5 is a top front right perspective view showing the installation of front and rear hinged, lockable, doors of an electrical cabinet in accordance with an aspect and embodiment of the disclosure.
Figure 6:
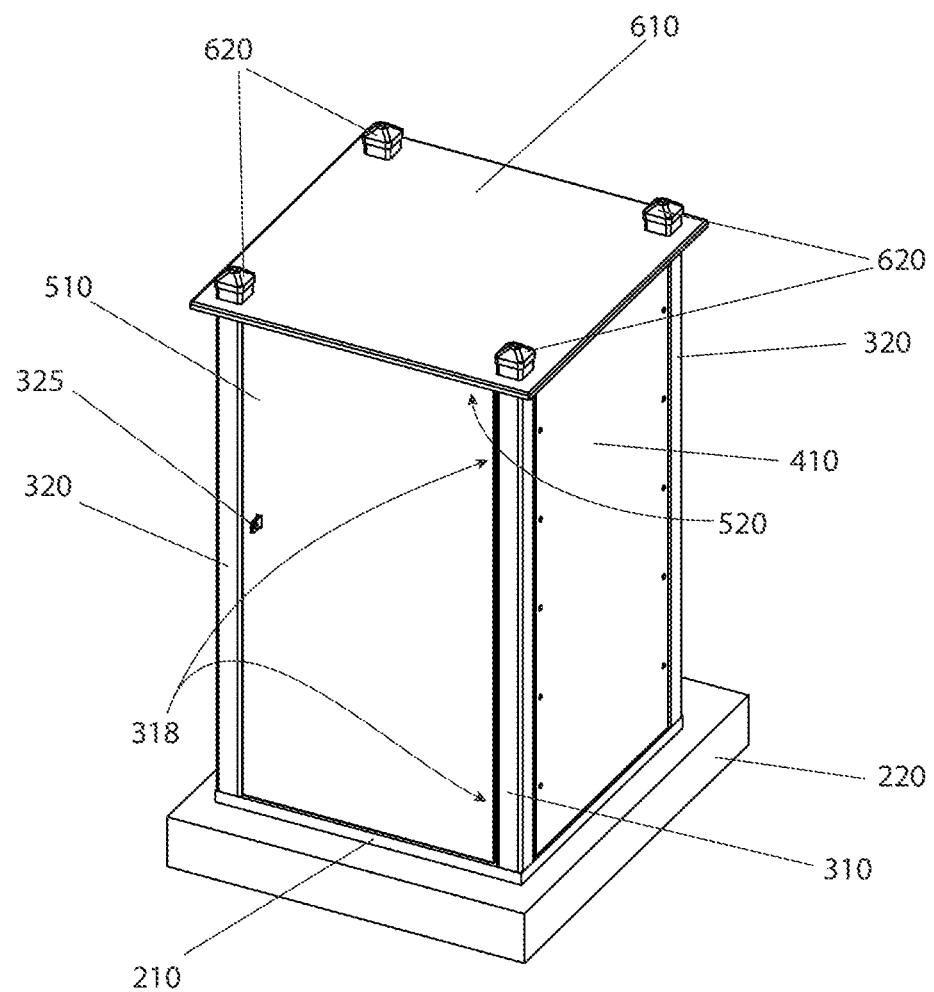
FIG. 6 is a top front right perspective view showing the installation of a top member and four cap members of an electrical cabinet in accordance with an aspect and embodiment of the disclosure.
Figure 10:
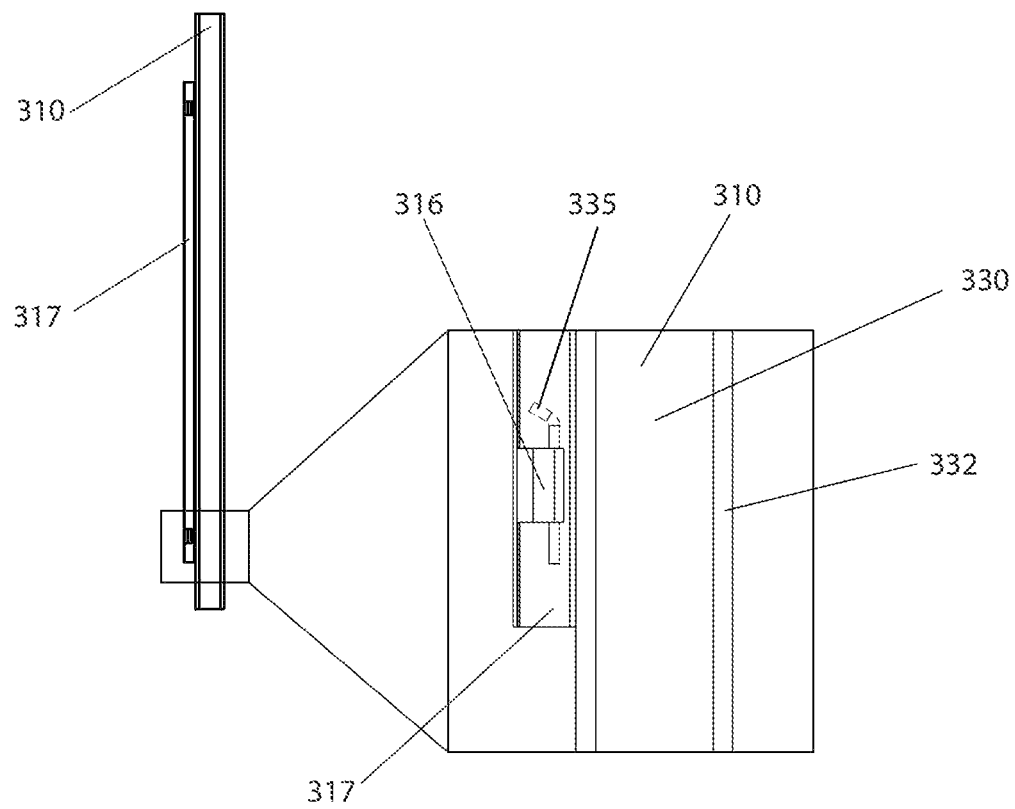
FIG. 10 shows a front view of a hinged post, together with a detail view of a fixed portion of a hinge for the hinged post of an electrical cabinet, in accordance with an aspect and embodiment of the disclosure.

As shown in FIG. 3, each post member 310, 320 further comprises a channel member 370 (such as a power-strut type channel member—also shown in FIGS. 10 and 11) attached to the post member as by welding or other known attachment method, the channel members 370 being adapted for retaining racks (not shown) for supporting and retaining the electrical components 10 within the cabinet 1000.

Referring further to FIGS. 3-7 and 9-13C, the cabinet kit 100 for constructing/installing a cabinet 1000 further comprises at least one, but preferably two as per this embodiment, side panel members 410 (e.g., first and second side panel members 410), and at least one, but preferably two as per this embodiment, door member(s) 510 (e.g., first and second door members 510), each side panel member comprising an upper edge 412, a lower edge 414, and two side edges 416. Each side panel member 410 is adapted for attachment (i.e., having holes for attachment with screws to channel members 370 both as indicated at 550) between the side edges 416 of the side panel members and the channel member 370 of each post.

The door members 510 each comprise an upper edge 512, a lower edge 514, and two side edges 516. Each door member 510 is adapted for hinged attachment on one side edge 516 thereof to the hinge member 318 (a portion 316 of which is attached to the post members 310), whereas the other side edge 516 of each door member is adapted for lockable engagement adjacent the door-stop members and hasps 325 attached to corresponding post members 320 by means of openings 517 adapted for receiving and retaining the hasps 325. Preferably the side edges 416 of each of the side panel members 410 and the side edges 516 of the door members 510 are curved as may be achieved with a sheet metal break, as shown in FIGS. 13A-13B.

The cabinet kit 100 further comprises a top member 610 for an electrical cabinet 1000, the top member having a plurality of outside edges 614. The top member 610 defines a plurality of holes 612 adapted for corresponding with and passing over the second ends 314, 324 of the post members 310, 320, respectively, the top member having an underside surface portion for resting on the upper edges 412 of the side panels 410. Further, there are provided a plurality, or four per this embodiment, of top caps 620 adapted for installation on the second ends 314, 324 of the four corner posts 310, 32o, each top cap being adapted for being press-fit attached to the second ends of the corner posts. The top caps 620 are adapted for securing the top member 610 in place resting on the upper edges 412 of the side panel members 410. Each of the edges 614 of the top member 610 overhang the upper edges 412, 512 of the side panel members 410 and door members 510, respectively, the edges 614 being curved downwardly as shown in FIG. 13C to help the top member to inhibit precipitation from entering a gap 520 left between the upper edges 512 of the door members 510 and the top member 610, the gap being adapted for allowing swinging door clearance between the door members and the top member.

In this preferred embodiment, the door members 510 are lockable. Again, in a preferred embodiment, the front door member 510 is adapted for controlling lockable access by a plurality of different lock keys (e.g., for the power company and the entity maintaining the cabinet), whereas the rear door member 510 is adapted for controlling lockable access by a single lock key (e.g., for the company maintaining the cabinet). Thus, as shown in FIGS. 1-13, there is disclosed an embodiment of an electrical cabinet 1000, wherein the cabinet side panel members 410 and door members 510 preferably comprise a rectangular lockable cabinet 1000 box having a roughly square top member 610.

The electrical cabinet 1000 is preferably comprised of existing components readily available online and/or at a hardware store. Thus, preferably, the plurality of rounded corner steel tube corner post members 310, 320 comprise four corner post members each known for having rounded corner steel stock having four flat surfaces 330, each flat surface extending along a length of each corner post member, and each flat surface being interconnected with two other flat surfaces with rounded corner radii 332, each corner radius extending along the length of each corner post member. Thus, the difference between corner post members 310 and corner post members 320 are the hardware preferably pre-attached to them before construction/installation of the electrical cabinet 1000 in the field. Whereas corner post members 310 have hinge member portions 316 and power strut channels 370 attached to them, corner post members 320 have door-stops and hasps 325, and power strut channels 370 attached to them.

Thus, in a simplified, and therefore preferred, embodiment, the electrical cabinet 1000 is provided with two lock corner post members 320, each such post member having a stop and hasp 325 attached at an intermediate location along the length of each such post member, and these two corner post members 32o are installed opposite, or across from, the other two hinged corner post members 310, each such post member 310 having hinge member portions 316 installed on them by way of a hinge bar 317.

Further, each of the first and second door members 510 further defines a hasp receiving opening 517 adjacent the side edge of each such door member installed opposite the hinged corner post member 310, the hasp receiving opening being adapted for facilitating locking of the first and second door members with a hasp 325 passing through the opening 517. Preferably, as shown in FIG. 12, for the front door 510, where a dual-lock 518, dual-key access is desired, there is provided a lock bar 1220 for passing through a hole in the hasp 325, and there are further provided two padlocks 1215, 1225, one passing through a hole at each end of the lock bar. Thus, with this embodiment, the front door 510 is lockable to be accessible by two different keys (e.g., one key being used by the utility company, and another key being used by an owner of the electrical cabinet 1000).

Figure 11:
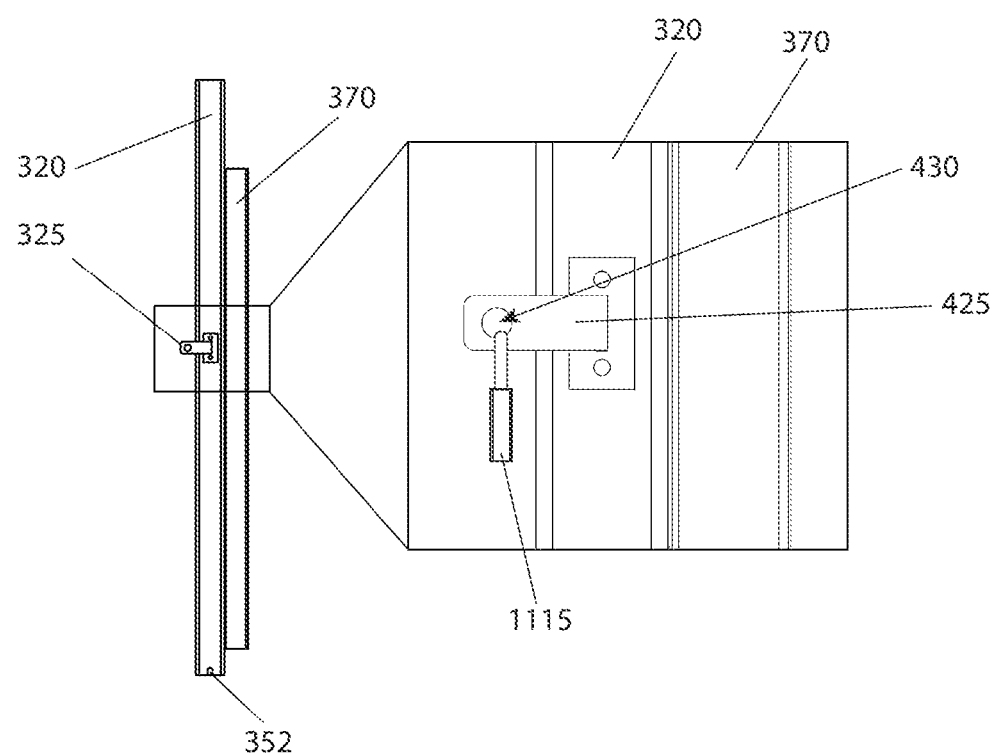

Referring specifically to FIG. 11, the stop and hasp 325 for the rear door 510 is shown as providing for single-key access, since as the hole in the hasp 325 is adapted for insertion through the hasp receiving opening 517 of the rear door, it is simply locked with a single padlock 1115 passing through the hole in the hasp. In this way, the rear of the cabinet is accessible by a single person (e.g., the owner of the electrical cabinet 1000).

Preferably, each of the two hinged corner post members 310 of this embodiment comprises a fixed portion 316 of a hinge 318 attached to each post member (i.e., the corner post members not having hasps thereon) by way of a hinge bar 317. Thus, with this preferred embodiment, each of the first and second door members 510 further comprises a leaf portion 315 of the hinge 318 attached to the edge of each the first and second door members opposite the hasp receiving opening of each of the door members. A leaf portion 315 of the hinges 318 are adapted for pivotable attachment of each of the door members 510 to corresponding fixed portions 316 of the hinge attached to the hinged corner post members 310, with the hinges 318 being adapted for receiving and retaining a hinge pin 335 to pivotably retain the hinge portions 315, 316 together while enabling each of the first and second door members 510 to pivot about the hinged post members 310 on the hinges.

Figure 8A:
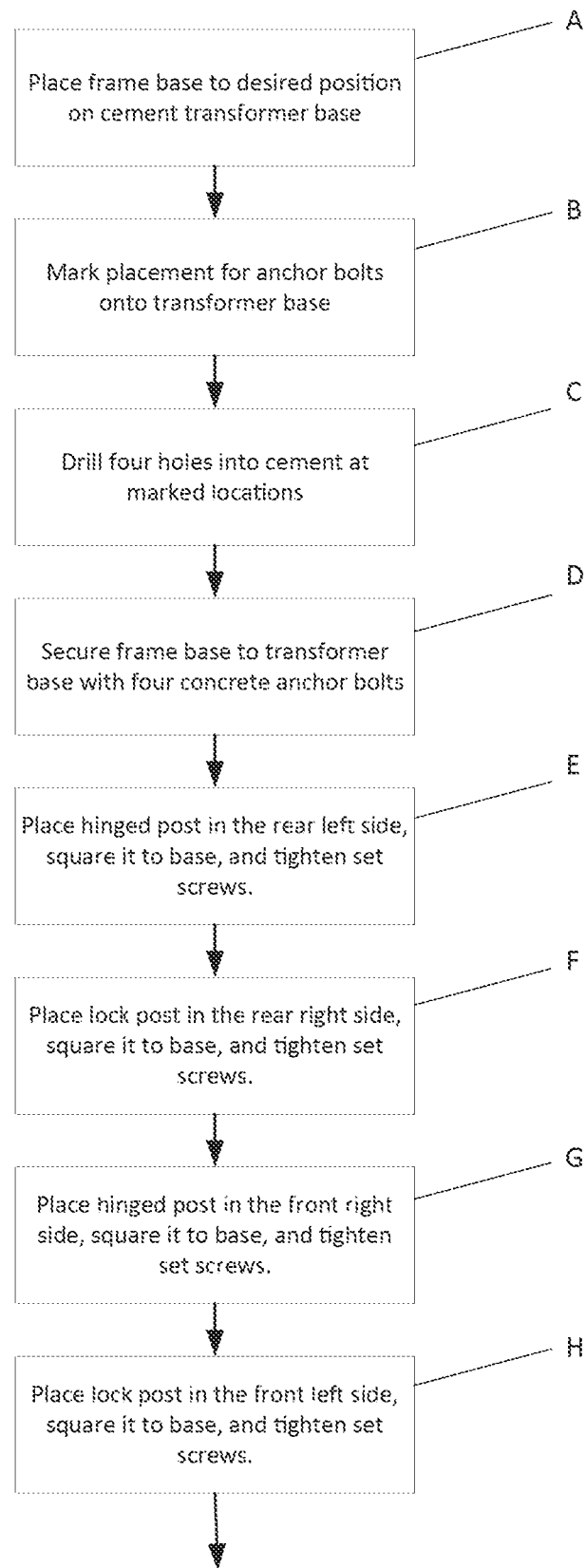
FIGS. 8A and 8B are flow charts illustrating steps for installation of an electrical cabinet in the field in accordance with an aspect of the disclosure.
Figure 8B:
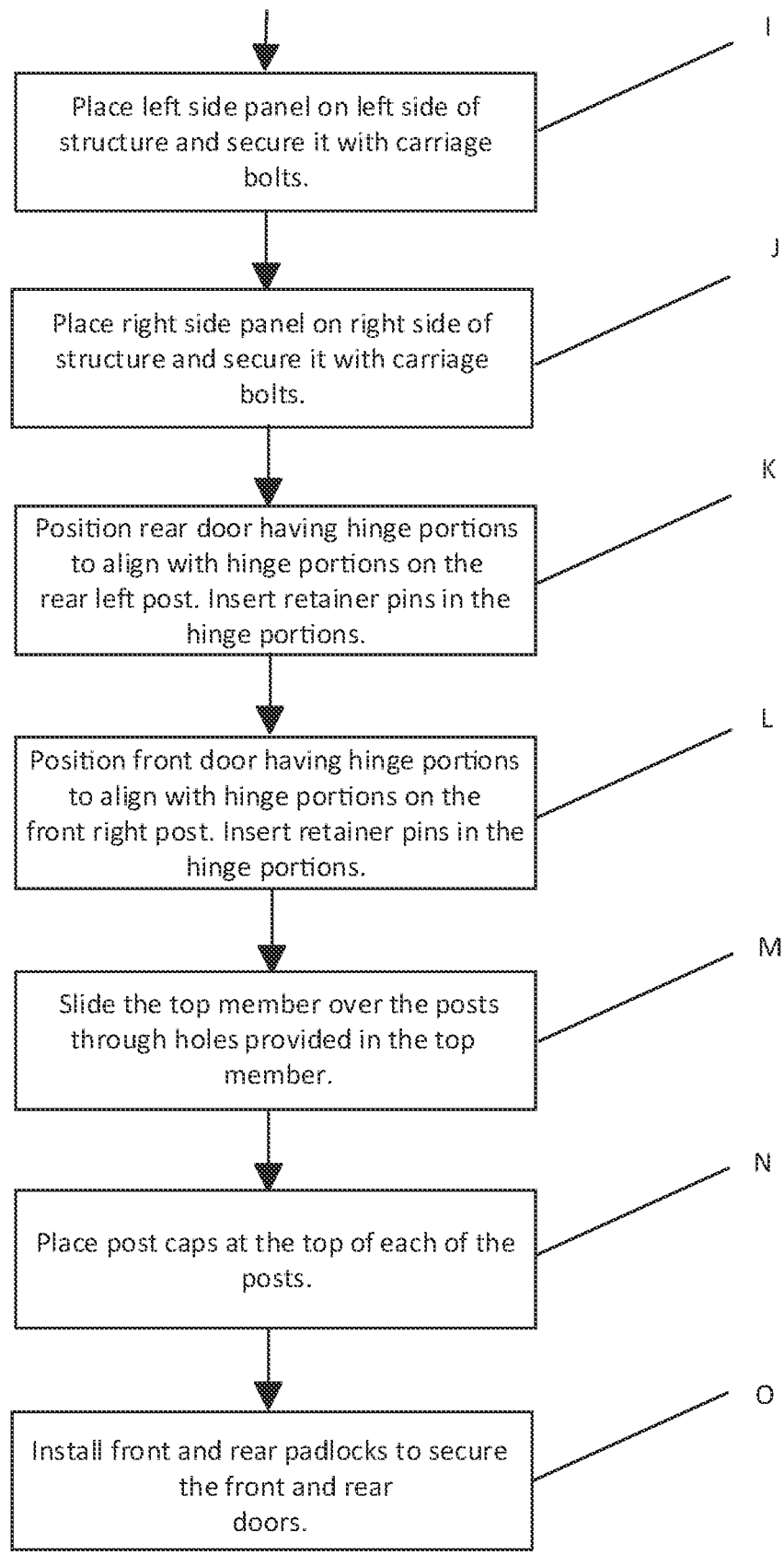
Figure 9:
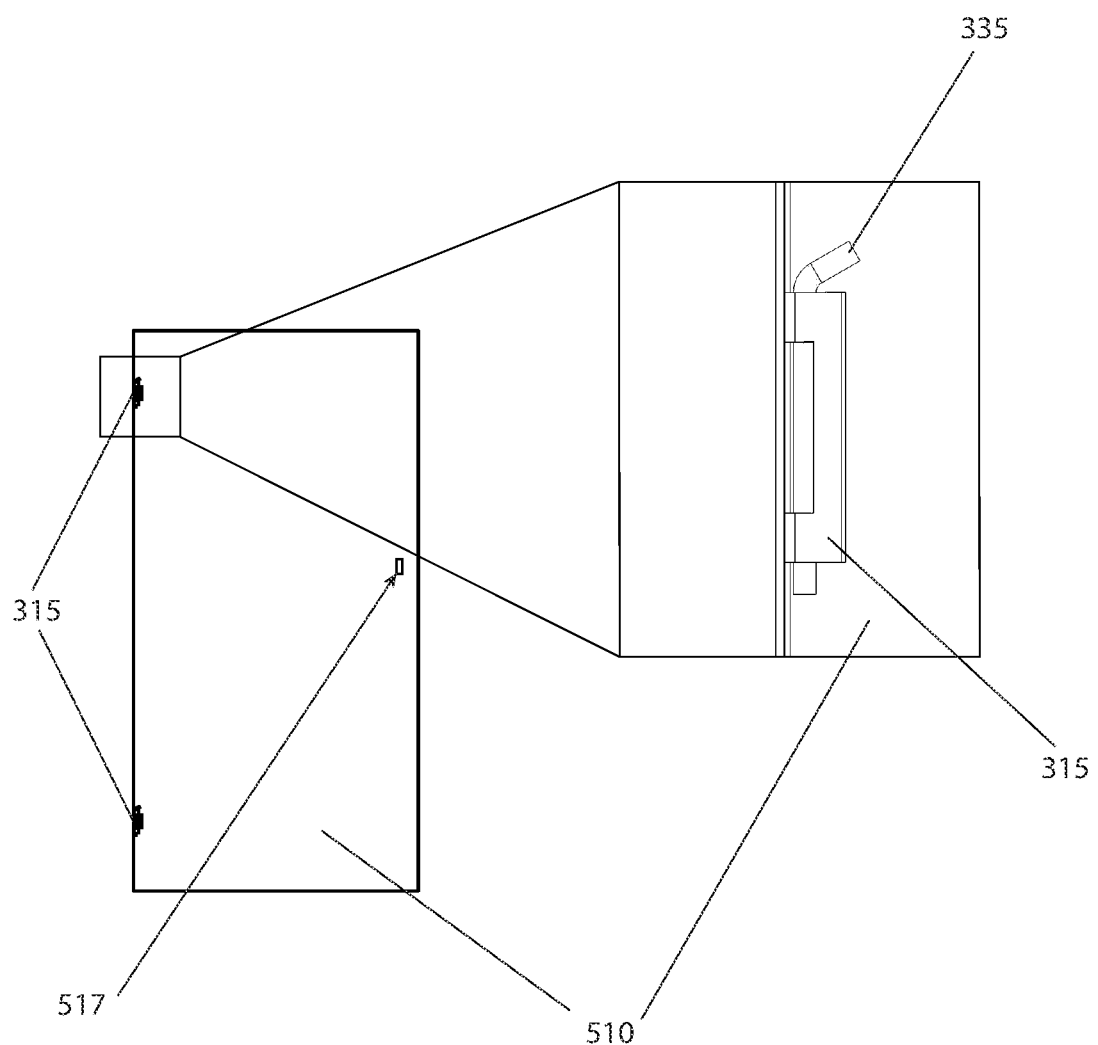
FIG. 9 is a detailed inside view of a door of an electrical cabinet showing a door portion of a hinge for the door in accordance with an aspect and embodiment of the disclosure.

Referring now to FIGS. 8A and 8B, in accordance with another aspect of the disclosure, there is provided a method of constructing and installing an electrical cabinet in the field on a typically cement transformer base and over pre-installed power distribution electronics, comprising:

A. Placing a frame base having anchor holes therein and corner pegs thereon at a desired position on a pre-poured cement transformer base;
B. Marking placement for anchor bolts onto the transformer base;
C. Drilling holes into cement of the transformer base at marked locations;
D. Securing frame base to transformer base with a plurality of concrete anchor bolts;
E. Placing a hinged post with a hinge portion and a channel member thereon on a left rear corner peg of the frame base and tightening a set screw (see set screw 350 of FIG. 3) to hold the post in place on the corner peg;
F. Placing a lock post with a stop member and hasp combination and a channel member thereon on the right rear corner peg of the frame base and tightening a set screw (see set screw 350 of FIG. 3) to hold the post in place on the corner peg;
G. Placing another hinged post with a hinge portion and a channel member thereon on the right front corner peg of the frame base and tightening a set screw (see set screw 350 of FIG. 3) to hold the post in place on the corner peg;
H. Placing another lock post with a stop member and hasp combination and a channel member thereon on the left front corner peg of the frame base and tightening a set screw (see set screw 350 of FIG. 3) to hold the post in place on the corner peg;
I. Placing a left-side panel on a left side of the structure and securing it to the channel members of the left-side posts;
J. Placing a right-side panel on a right side of the structure and securing it to the channel members of the right-side posts;
K. Positioning rear door with hinge portions to align with hinge portions on the rear left post and inserting retaining pins in the hinge portions;
L. Positioning front door with hinge portions to align with hinge portions on the front right post and inserting retaining pins in the hinge portions;
M. Sliding a top member over the four posts through holes provided in the top member;
N. Placing post caps at the top of each of the four posts;
O. Installing front and back padlocks to secure the structure.

One of ordinary skill in the art will recognize the inventive principles disclosed are not limited to the embodiments disclosed herein, and that various aspects of the disclosed embodiments may be combined to achieve additional embodiments.

In the preceding description, numerous details were set forth. It will be apparent, however, to one skilled in the art, that the present invention may be practiced without some of these specific details. Additionally, one of ordinary skill in the art will recognize the inventive principles disclosed are not limited to the embodiments disclosed herein, and that various aspects of the disclosed embodiments may be combined to achieve yet additional embodiments.

While a preferred embodiment of the present disclosure has been shown and described, it will be apparent to those skilled in the art that many changes and modifications may be made without departing from the claimed subject matter in its broader aspects. For example, it will be appreciated that one of ordinary skill in the art may mix and match the various components of the various embodiments of the claimed subject matter without departing from the true spirit of the claims. Thus, it will be appreciated that a portion, portions, or all of the cabinet may be pre-fabricated/constructed, whereas in a preferred embodiment the cabinet is capable of being mostly constructed and installed in the field from a kit. The appended claims are therefore intended to cover all such changes and modifications as fall within the true spirit and scope of the invention.

What is claimed is:

1. An outdoor electrical cabinet adapted for substantial construction and installation in the field on an existing, typically cement, transformer base, the cabinet being adapted for protecting electrical components from weather, damage, tampering, or theft, comprising:
a base member adapted for supporting the cabinet on the transformer base, the base member defining a plurality of holes adapted for enabling attachment of said base member to the transformer base with lag bolts, said base member further comprising a plurality of pegs;
a plurality of rounded corner steel tube post members, each said post member having first and second ends, the first end of each said post member being adapted for closely fitting onto a corresponding peg of said base member, wherein at least one of said post members further comprises a fixed portion of a hinge member attached thereto, and wherein at least one other of said post members further comprises a door-stop member attached thereto, each said post member further comprising a channel member attached to said post member;

at least one side panel member comprising upper and lower edges and two side edges, each said side panel member adapted for attachment between the side edges and the channel member of each post member;

at least one door member comprising upper and lower edges and two side edges, each said door member adapted for hinged attachment on one side edge thereof to the hinge member attached to the at least one of said post members, the other side edge of each said at least one door member further adapted for lockable engagement adjacent the door-stop member attached to the at least one of said post members;

a top member defining a plurality of holes adapted for corresponding with and passing over the second ends of said post members, said top member having an underside surface portion for resting on the upper edge of said at least one side panel member; and a plurality of top caps adapted for installation on the second ends of said plurality of post members, each top cap being adapted for being press-fit attached to the second ends of said plurality of post members, said plurality of top caps being adapted for securing said top member in place resting on said at least one side panel member, wherein said top member inhibits precipitation from entering a gap left between the upper edge of said at least one door member and said top member, the gap being adapted for allowing swinging door clearance between said at least one door member and said top member.

2. The electrical cabinet of claim 1, wherein said at least one door member comprises a plurality of door members, one of said plurality of door members comprising a plurality of lock means adapted for controlling lockable access by a plurality of different lock keys.

3. The electrical cabinet of claim 2, wherein said plurality of door members comprises first and second door members, wherein said at least one cabinet side panel member and door members comprise a rectangular box, wherein said top member comprises a rectangular top member, wherein said first door member comprises a plurality of lock means adapted for controlling lockable access by a plurality of different lock keys, and wherein said second door member comprises a single lock means adapted for controlling lockable access by one key.

4. The electrical cabinet of claim 3, wherein said plurality of post members comprises four corner post members, each post member comprised of existing rounded corner steel stock having four flat surfaces, each of the flat surfaces extending along a length of each corner post member, and each of the flat surfaces being interconnected with two other of the flat surfaces with rounded corner radii, each corner radius extending along the length of each post member.

5. The electrical cabinet of claim 4, wherein each of two of said four corner post members further comprises a hasp attached to said each of two corner post members, each of said first and second door members further defining a hasp receiving opening adjacent one of said side edges of each of said first and second door members for facilitating locking of said first and second door members, said hasp adapted for insertion through the opening in each said first and second door members to be adapted for receiving and retaining a padlock to allow locking of each said first door member and second door member with lock means.

6. The electrical cabinet of claim 5, wherein each of two other corner post members of said plurality of corner post members further comprises a fixed portion of a hinge attached to said each of two other corner post members, each of said first and second door members further comprising a leaf portion of the hinge attached to an edge of each said first and second door member opposite the hasp receiving opening of each of said door members, adapted for pivotable attachment of each said first and second door members to corresponding said fixed portions of the hinge attached to said each of two other corner post members, the fixed portion of said hinge and the leaf portion of said hinge adapted for receiving and retaining a hinge pin to pivotably retain the hinge portions together while enabling each said first and second door members to pivot on the hinge portions.

7. The electrical cabinet of claim 1, wherein said top member comprises edges that overhang each of said at least one side panel member and each said at least one door member, each edge of said top member being curved downwardly to help prevent precipitation from getting into the gap between the top member edges and the at least one door member.

8. An outdoor electrical cabinet adapted for installation on a, typically cement, transformer base, the cabinet being adapted for protecting electrical components from weather, damage, tampering, or theft, comprising:

a base member adapted for supporting the cabinet on the transformer base, said base member defining a plurality of holes adapted for enabling attachment of said base member to the transformer base with lag bolts, said base member further comprising a plurality of post member pegs;

a plurality of rounded corner steel tube post members, each said post member having first and second ends, each said post member being comprised of existing rounded corner steel stock having four flat surfaces, each flat surface extending along a length of each post member, and each flat surface being interconnected with two other flat surfaces with rounded corner radii, each corner radius extending along the length of each post member, the first end of each said post member pre-attached onto a corresponding peg of said base member, wherein a plurality of said plurality of post members further comprises a fixed portion of a hinge member pre-attached thereto, and wherein another plurality of said plurality of post members further comprises a door-stop member pre-attached thereto, each said post member further comprising a channel member pre-attached to said post member, wherein each of said another plurality of post members further comprises a hasp pre-attached to said another plurality of post members;

a plurality of side panel members, each side panel member comprising upper and lower edges and two inwardly curved side edges, each said side panel member being pre-attached between the side edges and the channel member of each of said plurality of post members;

a plurality of lockable door members, each comprising upper and lower edges and two inwardly-curved side edges, each said door member having a leaf portion of a hinge pre-attached to a side edge of said door member and being hinged pre-attached on the side edge of the door member to the hinge member fixed portions attached to the plurality of said plurality of post members, the other side edge of each of said plurality of door members further defining a hasp receiving opening adjacent another of said side edges of each of said plurality of door members for facilitating locking of each of said plurality of door members, said hasp being adapted for insertion through the opening in each said door member for receiving and retaining a padlock allowing locking of each of said plurality of door members with lock means;

a top member having downwardly curved edges and defining a plurality of holes adjacent each corner of the top member through which the second ends of said post members pass, said top member having an underside portion that rests on the upper edge of each said side panel member; and a plurality of top caps, each top cap of said plurality of top caps being press-fit attached to the second end of a corresponding said post member, said plurality of top caps securing said top member in place resting on said side panel members, wherein the downwardly curved edges of said top member are adapted to inhibit precipitation from entering gaps between the upper edge of said door members and the top member, the gaps being adapted for allowing swinging door clearance between said door members and said top member.

9. A method of installing an electrical cabinet over pre-installed power distribution electronics, comprising:

Placing a frame base having anchor holes therein and corner pegs thereon at a desired position on a pre-poured cement transformer base;

Marking placement for anchor bolts onto the transformer base;

Drilling holes into cement of the transformer base at marked locations;

Securing the frame base to the transformer base with a plurality of concrete anchor bolts;

Placing a first hinged post with a hinge portion and a channel member thereon on a left rear corner peg of the frame base and tightening a set screw to hold the post in place on the corner peg;

Placing a first lock post with a stop member and hasp combination and a channel member thereon on the right rear corner peg of the frame base and tightening a set screw to hold the post in place on the corner peg;

Placing another hinged post with a hinge portion and a channel member thereon on the right front corner peg of the frame base and tightening a set screw to hold the post in place on the corner peg;

Placing another lock post with a stop member and hasp combination and a channel member thereon on the left front corner peg of the frame base and tightening a set screw to hold the post in place on the corner peg;

Placing a left: side panel on the first hinged post and the another lock post and securing the left-side panel to the channel members of the first hinged post and the another lock post;

Placing a right-side panel on the first lock post and the another hinged post and securing the right-side panel to the channel members of the first lock post and the another hinged post;

Positioning a rear door with a hinge portion thereon to align with the hinge portion of the first hinged post and inserting a retainer pin in the hinge portions;

Positioning a front door with a hinge portion thereon to align with the hinge portion of the another hinged post and inserting a retaining pin in the hinge portions;

Slide a top member over the four posts through holes provided in the top member;

Place post caps at the top of each of the four posts; and

Install front and back padlocks to secure the front door and the rear door.

\* \* \* \* \*